US008566616B1

(12) United States Patent
Langhammer

(10) Patent No.: US 8,566,616 B1
(45) Date of Patent: *Oct. 22, 2013

(54) METHOD AND APPARATUS FOR PROTECTING DESIGNS IN SRAM-BASED PROGRAMMABLE LOGIC DEVICES AND THE LIKE

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1745 days.

This patent is subject to a terminal disclaimer.

(21) Appl. No.: 10/938,220

(22) Filed: Sep. 10, 2004

(51) Int. Cl.
*G06F 11/30* (2006.01)
*G06F 12/14* (2006.01)

(52) U.S. Cl.
USPC ............... 713/190; 713/168; 726/34; 326/37

(58) Field of Classification Search
USPC .................... 713/190, 168; 726/34; 326/37
See application file for complete search history.

(56) References Cited

U.S. PATENT DOCUMENTS

| | | | |
|---|---|---|---|
| 4,435,752 A | 3/1984 | Winkelman |
| RE31,736 E | 11/1984 | Mueller et al. |
| 4,609,986 A | 9/1986 | Hartmann et al. |
| 4,617,479 A | 10/1986 | Hartmann et al. |
| 4,642,487 A | 2/1987 | Carter |
| 4,677,318 A | 6/1987 | Veenstra |
| 4,706,216 A | 11/1987 | Carter |
| 4,713,792 A | 12/1987 | Hartmann et al. |
| 4,774,421 A | 9/1988 | Hartmann et al. |
| 4,871,930 A | 10/1989 | Wong et al. |
| 4,899,067 A | 2/1990 | So et al. |
| 4,912,342 A | 3/1990 | Wong et al. |
| 5,033,084 A | 7/1991 | Beecher |
| 5,081,675 A | 1/1992 | Kittirutsunetorn |
| 5,121,006 A | 6/1992 | Pederson |
| 5,148,485 A | 9/1992 | Dent |
| 5,177,790 A | 1/1993 | Hazard |
| 5,220,214 A | 6/1993 | Pederson |
| 5,260,610 A | 11/1993 | Pederson et al. |
| 5,260,611 A | 11/1993 | Cliff et al. |
| 5,350,954 A | 9/1994 | Patel |
| 5,371,422 A | 12/1994 | Patel et al. |
| 5,375,240 A | 12/1994 | Grundy |

(Continued)

OTHER PUBLICATIONS

Minnick, R.C., "A Survery of Microcellular Research," Journal of Association for Computing Machinery, vol. 14, No. 2, pp. 203-241, Apr. 1967.

(Continued)

*Primary Examiner* — Fikremariam A Yalew
(74) *Attorney, Agent, or Firm* — Weaver Austin Villeneuve & Sampson LLP

(57) ABSTRACT

Use of an electronic design in a configurable device is controlled by a secure device. The configurable device includes an authorization code generator having a sequence generator and an encryption core implementing an encryption algorithm. The secure device uses the same sequence generator and encryption core in its own authorization code generator. The sequence generators in the configurable device and secure device generate identical streams of values that are encrypted using the encryption algorithm. The encrypted values are compared in the configurable device by a comparator. When the streams of encrypted values are not identical, the electronic design is prevented from operating. Where the period of the sequence generated by the sequence generators is long, such as $2^{64}$, the output of the encryption cores will contain that many different encrypted values, a substantial amount of highly randomized output used as authorization code for the protection of the electronic design.

18 Claims, 6 Drawing Sheets

(56) References Cited

U.S. PATENT DOCUMENTS

| | | |
|---|---|---|
| 5,388,157 A | 2/1995 | Austin |
| 5,450,022 A | 9/1995 | New |
| 5,457,408 A | 10/1995 | Leung |
| 5,459,673 A | 10/1995 | Carmean et al. |
| 5,463,561 A | 10/1995 | Razdan |
| 5,479,512 A | 12/1995 | Weiss |
| 5,513,262 A | 4/1996 | Van Rumpt et al. |
| 5,541,849 A | 7/1996 | Rostoker et al. |
| 5,544,066 A | 8/1996 | Rostoker et al. |
| 5,548,228 A | 8/1996 | Madurawe |
| 5,553,002 A | 9/1996 | Dangelo et al. |
| 5,563,592 A | 10/1996 | Cliff et al. |
| 5,581,198 A | 12/1996 | Trimberger |
| 5,594,793 A | 1/1997 | Bahout |
| 5,636,281 A | 6/1997 | Antonini |
| 5,748,744 A * | 5/1998 | Levy et al. ............ 380/52 |
| 5,757,908 A | 5/1998 | Cooper et al. |
| 5,768,372 A | 6/1998 | Sung et al. |
| 5,778,070 A | 7/1998 | Mattison |
| 5,799,085 A | 8/1998 | Shona |
| 5,802,376 A | 9/1998 | DeRoo et al. |
| 5,828,753 A | 10/1998 | Davis |
| 5,835,594 A | 11/1998 | Albrecht et al. |
| 5,838,901 A | 11/1998 | Curd et al. |
| 5,841,967 A | 11/1998 | Sample et al. |
| 5,844,986 A | 12/1998 | Davis |
| 5,867,395 A | 2/1999 | Watkins et al. |
| 5,870,308 A | 2/1999 | Dangelo et al. |
| 5,875,112 A | 2/1999 | Lee |
| 5,889,266 A | 3/1999 | Schrenk |
| 5,892,900 A | 4/1999 | Ginter et al. |
| 5,903,578 A | 5/1999 | De et al. |
| 5,915,017 A | 6/1999 | Sung et al. |
| 5,963,454 A | 10/1999 | Dockser et al. |
| 5,970,142 A * | 10/1999 | Erickson ............ 713/189 |
| 5,982,683 A | 11/1999 | Watson et al. |
| 5,991,880 A | 11/1999 | Curd et al. |
| 5,995,623 A | 11/1999 | Kawano et al. |
| 6,012,033 A | 1/2000 | Vanden Berge |
| 6,018,581 A * | 1/2000 | Shona et al. ............ 380/46 |
| 6,023,565 A | 2/2000 | Lawman et al. |
| 6,026,220 A | 2/2000 | Cleereman et al. |
| 6,102,961 A | 8/2000 | Lee et al. |
| 6,102,963 A * | 8/2000 | Agrawal ............ 716/17 |
| 6,118,869 A | 9/2000 | Kelem et al. |
| 6,120,549 A | 9/2000 | Goslin et al. |
| 6,122,378 A | 9/2000 | Yoshiura et al. |
| 6,150,837 A * | 11/2000 | Beal et al. ............ 326/39 |
| 6,157,317 A | 12/2000 | Walker |
| 6,173,245 B1 | 1/2001 | Karchmer et al. |
| 6,205,572 B1 | 3/2001 | Dupenloup |
| 6,212,639 B1 * | 4/2001 | Erickson et al. ............ 726/26 |
| 6,216,255 B1 | 4/2001 | Ito et al. |
| 6,216,258 B1 | 4/2001 | Mohan et al. |
| 6,243,851 B1 | 6/2001 | Hwang et al. |
| 6,246,254 B1 | 6/2001 | Choukalos et al. |
| 6,263,483 B1 | 7/2001 | Dupenloup |
| 6,289,498 B1 | 9/2001 | Dupenloup |
| 6,292,931 B1 | 9/2001 | Dupenloup |
| 6,308,299 B1 | 10/2001 | Burch et al. |
| 6,317,872 B1 | 11/2001 | Gee et al. |
| 6,324,672 B1 | 11/2001 | Lawman et al. |
| 6,324,678 B1 | 11/2001 | Dangelo et al. |
| 6,336,107 B1 | 1/2002 | Uchida et al. |
| 6,346,427 B1 | 2/2002 | Gardner et al. |
| 6,378,123 B1 | 4/2002 | Dupenloup |
| 6,421,251 B1 | 7/2002 | Lin |
| 6,446,243 B1 | 9/2002 | Huang et al. |
| 6,467,072 B1 | 10/2002 | Yang et al. |
| 6,480,027 B1 | 11/2002 | Ngai et al. |
| 6,487,699 B1 | 11/2002 | Devins et al. |
| 6,490,711 B2 | 12/2002 | Buckley, Jr. |
| 6,507,592 B1 | 1/2003 | Hurvig et al. |
| 6,536,028 B1 | 3/2003 | Katsioulas et al. |
| 6,546,507 B1 | 4/2003 | Coyle et al. |
| 6,557,020 B1 | 4/2003 | Amano et al. |
| 6,557,159 B1 | 4/2003 | Kutzschebauch et al. |
| 6,587,995 B1 | 7/2003 | Duboc et al. |
| 6,609,244 B2 | 8/2003 | Kato et al. |
| 6,621,425 B2 * | 9/2003 | Maeda ............ 341/50 |
| 6,633,788 B1 | 10/2003 | Riley et al. |
| 6,647,494 B1 * | 11/2003 | Drews ............ 713/170 |
| 6,654,889 B1 * | 11/2003 | Trimberger ............ 713/191 |
| 6,658,045 B1 | 12/2003 | Jin |
| 6,662,283 B1 | 12/2003 | Brun et al. |
| 6,697,948 B1 | 2/2004 | Rabin et al. |
| 6,708,322 B2 | 3/2004 | Ito |
| 6,745,358 B1 | 6/2004 | Watkins |
| 6,784,903 B2 | 8/2004 | Kodosky et al. |
| 6,791,353 B1 * | 9/2004 | Beal et al. ............ 326/39 |
| 6,810,514 B1 * | 10/2004 | Alfke et al. ............ 326/38 |
| 6,836,877 B1 | 12/2004 | Dupenloup |
| 6,894,527 B1 * | 5/2005 | Donlin et al. ............ 326/8 |
| 6,910,199 B2 | 6/2005 | Sachs |
| 6,976,239 B1 | 12/2005 | Allen et al. |
| 6,981,153 B1 | 12/2005 | Pang et al. |
| 7,010,689 B1 * | 3/2006 | Matyas et al. ............ 713/168 |
| 7,024,345 B1 | 4/2006 | Stamm et al. |
| 7,107,569 B2 | 9/2006 | Ito |
| 7,117,373 B1 * | 10/2006 | Trimberger et al. ............ 713/193 |
| 7,131,091 B1 | 10/2006 | Ganesan et al. |
| 7,134,025 B1 * | 11/2006 | Trimberger ............ 713/189 |
| 7,162,644 B1 * | 1/2007 | Trimberger ............ 713/189 |
| 7,191,339 B1 * | 3/2007 | Trimberger ............ 713/185 |
| 7,197,647 B1 * | 3/2007 | Van Essen et al. ............ 713/189 |
| 7,200,235 B1 * | 4/2007 | Trimberger ............ 380/277 |
| 7,203,842 B2 * | 4/2007 | Kean ............ 713/189 |
| 7,218,251 B2 * | 5/2007 | Tsutsui et al. ............ 341/50 |
| 7,219,237 B1 * | 5/2007 | Trimberger ............ 713/193 |
| 7,224,801 B2 * | 5/2007 | Abdo et al. ............ 380/270 |
| 7,242,766 B1 * | 7/2007 | Lyle ............ 380/2 |
| 7,254,800 B1 * | 8/2007 | Trimberger ............ 716/117 |
| 7,366,306 B1 * | 4/2008 | Trimberger ............ 380/278 |
| 7,373,668 B1 * | 5/2008 | Trimberger ............ 726/26 |
| 7,376,826 B2 * | 5/2008 | Tardo et al. ............ 713/151 |
| 7,380,131 B1 * | 5/2008 | Trimberger ............ 713/193 |
| 7,389,429 B1 * | 6/2008 | Trimberger ............ 713/194 |
| 7,409,652 B1 | 8/2008 | Fox et al. |
| 7,434,065 B2 * | 10/2008 | Rodgers et al. ............ 713/189 |
| 7,454,323 B1 | 11/2008 | Bain |
| 7,484,081 B1 * | 1/2009 | Langhammer et al. ............ 713/1 |
| 7,509,548 B2 | 3/2009 | Mates |
| 7,519,823 B1 * | 4/2009 | Schumacher et al. ............ 713/176 |
| 7,581,117 B1 | 8/2009 | Irving et al. |
| 7,607,025 B1 * | 10/2009 | Trimberger ............ 713/193 |
| 7,647,575 B2 | 1/2010 | Koga et al. |
| 2001/0001881 A1 | 5/2001 | Mohan et al. |
| 2001/0015919 A1 * | 8/2001 | Kean ............ 365/200 |
| 2001/0021926 A1 | 9/2001 | Schneck et al. |
| 2001/0032318 A1 * | 10/2001 | Yip et al. ............ 713/190 |
| 2001/0037458 A1 * | 11/2001 | Kean ............ 713/193 |
| 2001/0052072 A1 * | 12/2001 | Jung ............ 713/160 |
| 2002/0003435 A1 * | 1/2002 | Andrews et al. ............ 326/39 |
| 2002/0003436 A1 * | 1/2002 | Andrews et al. ............ 326/40 |
| 2002/0008540 A1 * | 1/2002 | Britton et al. ............ 326/40 |
| 2002/0010902 A1 * | 1/2002 | Chen et al. ............ 716/16 |
| 2002/0024453 A1 * | 2/2002 | Maeda ............ 341/50 |
| 2002/0031166 A1 * | 3/2002 | Subramanian et al. ............ 375/130 |
| 2002/0112140 A1 * | 8/2002 | Miyamori ............ 712/1 |
| 2002/0138244 A1 | 9/2002 | Meyer |
| 2002/0150252 A1 * | 10/2002 | Wong ............ 380/277 |
| 2002/0166058 A1 * | 11/2002 | Fueki ............ 713/194 |
| 2002/0168067 A1 * | 11/2002 | Kouzminov ............ 380/201 |
| 2002/0178353 A1 * | 11/2002 | Graham ............ 713/151 |
| 2002/0199110 A1 * | 12/2002 | Kean ............ 713/189 |
| 2002/0199142 A1 * | 12/2002 | Gefen ............ 714/724 |
| 2003/0018630 A1 * | 1/2003 | Indeck et al. ............ 707/3 |
| 2003/0044020 A1 * | 3/2003 | Aboba et al. ............ 380/278 |
| 2003/0052710 A1 * | 3/2003 | Lasselet Goldfinch ............ 326/37 |
| 2003/0057996 A1 * | 3/2003 | Lasselet Goldfinch ............ 326/37 |
| 2003/0145286 A1 | 7/2003 | Pajak et al. |
| 2003/0145297 A1 | 7/2003 | Cote et al. |
| 2003/0188275 A1 | 10/2003 | Meares |
| 2003/0208681 A1 * | 11/2003 | Muntz et al. ............ 713/179 |

(56) References Cited

U.S. PATENT DOCUMENTS

| | | | | |
|---|---|---|---|---|
| 2003/0221151 | A1* | 11/2003 | Agarwal | 714/725 |
| 2003/0229877 | A1* | 12/2003 | Bersch et al. | 716/16 |
| 2004/0000927 | A1* | 1/2004 | Dante | 326/39 |
| 2004/0005052 | A1* | 1/2004 | Maeda | 380/28 |
| 2004/0010739 | A1* | 1/2004 | Odom et al. | 714/724 |
| 2004/0017221 | A1* | 1/2004 | Agarwal | 326/38 |
| 2004/0036500 | A1* | 2/2004 | Bratt | 326/39 |
| 2004/0044970 | A1* | 3/2004 | Anderson et al. | 716/1 |
| 2004/0080999 | A1* | 4/2004 | Madurawe | 365/200 |
| 2004/0119098 | A1* | 6/2004 | Or-Bach et al. | 257/202 |
| 2004/0145942 | A1* | 7/2004 | Leijten-Nowak | 365/154 |
| 2004/0194049 | A1 | 9/2004 | Mizumaki | |
| 2004/0243384 | A1* | 12/2004 | Chen et al. | 703/23 |
| 2005/0001652 | A1* | 1/2005 | Malik et al. | 326/38 |
| 2005/0071639 | A1* | 3/2005 | Rodgers et al. | 713/176 |
| 2005/0125642 | A1* | 6/2005 | Kimura | 712/226 |
| 2005/0182979 | A1* | 8/2005 | Gross et al. | 713/300 |
| 2005/0229128 | A1 | 10/2005 | Sripada | |
| 2005/0246602 | A1* | 11/2005 | Bahl et al. | 714/733 |
| 2005/0250473 | A1* | 11/2005 | Brown et al. | 455/411 |
| 2005/0254665 | A1* | 11/2005 | Vaudrey et al. | 381/72 |
| 2005/0280438 | A1* | 12/2005 | Park | 326/41 |
| 2005/0289355 | A1* | 12/2005 | Kitariev et al. | 713/182 |
| 2006/0055421 | A1* | 3/2006 | Siemers | 326/38 |
| 2006/0059345 | A1 | 3/2006 | Fayad et al. | |
| 2006/0059368 | A1 | 3/2006 | Fayad et al. | |
| 2006/0059369 | A1 | 3/2006 | Fayad et al. | |
| 2006/0059372 | A1 | 3/2006 | Fayar et al. | |
| 2006/0059373 | A1 | 3/2006 | Fayad et al. | |
| 2006/0059574 | A1 | 3/2006 | Fayad et al. | |
| 2006/0146596 | A1* | 7/2006 | Madurawe | 365/154 |
| 2006/0197552 | A1* | 9/2006 | Lawson et al. | 326/38 |
| 2006/0209584 | A1* | 9/2006 | Devadas et al. | 365/52 |
| 2007/0011578 | A1* | 1/2007 | Lewis et al. | 714/763 |
| 2007/0124645 | A1* | 5/2007 | Ito et al. | 714/758 |
| 2007/0188188 | A1* | 8/2007 | Or-Bach et al. | 326/38 |
| 2007/0288765 | A1* | 12/2007 | Kean | 713/193 |
| 2008/0021888 | A1 | 1/2008 | Miller | |
| 2008/0030226 | A1* | 2/2008 | Goodnow et al. | 326/38 |
| 2008/0270805 | A1 | 10/2008 | Kean | |

OTHER PUBLICATIONS

Wahlstrom, S.E., "Programmable Logic Arrays—Cheaper by the Millions," Electronics, Dec. 11, 1967, pp. 90-95.

Langhammer et al., "Method and Apparatus for Protecting Designs in Sram-Based Programmable Logic Devices and the Like," U.S. Appl. No. 09/975,094, filed Oct. 10, 2001.

Michael Barr: "How Programmable Logic Works", Embedded Systems Programming, Jun. 1999, pp. 75-84. In the paragraph entitled: "Device Programming".

Hong et al., "Behavioral Synthesis Techniques for Intellectual Property Protection," Proceedings of the 36th Annual Conference on Design Automation (DAC '99), pp. 849-854, 1999.

Gupta et al., "Introducing Core-Based System Design," Design & Test of Computers, IEEE, vol. 14, Issue: 4, pp. 15-25, 1997.

Lach et al., "FPGA Fingerprinting Techniques for Protecting Intellectual Property," Proceedings of CICC, 4 pages, 1998.

Draft Developer's Documentation sent to Developers with Sample Code for Testing, Dec. 19, 1997. ("MegaWizard® Plug-In Manager-Megafunction Wizards Information Exchange Requirements").

Press Release from Altera Corporation, Altera's Mega Wizard Plug-Ins Offer the First Too-Independent Parameterized Logic Cores, Feb. 2, 1998.

"A Developers Guide to the Design of MegaWizard® Megafunction Wizards," Documentation for Developers Provided with Final Product Release, Jun. 30, 1998.

"Mega Wizard Plug-Ins," provided on Altera Corporation's World Wide Web Home Page (www.altera.com), prior to Jan. 11, 1999.

"Altera Megafunctions," provided on Altera Corporation's World Wide Web Home Page (www.altera.com), prior to Jan. 11, 1999.

"AMPP Megafunction: Telephone Tone Generation Megafunction," Provided on Altera Corporation's World Wide Web Home Page (www.altera.com), prior to Jan. 11, 1999.

"Introduction to Megafunctions," provided on Altera Corporation's World Wide Web Home Page (www.altera.com), prior to Jan. 11, 1999.

PowerPoint® presentation describing "Megafunction Wizard" functionality made Nov. 1997.

Kahng et al., "Watermarking techniques for intellectual property protection," Design Automation Conference, Jun. 1998.

Lach et al., "Signature hiding techniques for FPGA intellectual property protection," ACM 1998.

Lach et al., "Robust FPGA Intellectual property protection through multiple small watermarks", ACM 1998.

Intellectual property protection development working group, "Intellectual property protection: schemes, alternatives and discussion", Aug. 2000.

Cooke, L.H., "VSIA—Its advantage four different perspectives", IEEE, 1997.

Minnick, R.C., A Survey of Microcellular Research,: Journal of Association for Computing Machinery, vol. 14, No. 2, pp. 203-241, Apr. 1967.

Wahlstrom, S.E., "Programmable Logic Arrays-Cheaper by the Millions", Electronics, Dec. 11, 1967, pp. 90-95.

A. Mukhopadhyay, Recent Developments in Switching Theory, ed., Academic Press, Chapters VI-IX, pp. 229-254 and 369-422, 1971.

Langhammer et al., "Method and Apparatus for Protecting Designs in Sram-Based Programmable Logic Devices and the Like", Altera Corporation, U.S. Appl. No. 09/975,094, filed Oct. 10, 2001, pp. 1-38.

Molson et al., "Method and Apparatus for Providing a Protected Intellectual Property Hardware", Altera Corporation, U.S. Appl. No. 09/823,700, filed Mar. 30, 2001, pp. 1-30.

Molson et al., "Method and Apparatus for Providing Protected Intellectual Property", Altera Corporation, U.S. Appl. No. 11/372,599, filed Mar. 10, 2006, pp. 1-27.

Langhammer et al., "Security Core Using Soft Key", Altera Corporation, U.S. Appl. No. 11/490,764, filed Jul. 20, 2006. pp. 1-33.

Langhammer et al., "Method and Apparatus for Limiting Use of Ip", Altera Corporation, U.S. Appl. No. 11/145,458, filed Jun. 2, 2005, pp. 1-35.

U.S. Office Action dated Jan. 28, 2010, U.S. Appl. No. 11/490,764.

\* cited by examiner

METHOD AND APPARATUS FOR PROTECTING DESIGNS IN SRAM-BASED PROGRAMMABLE LOGIC DEVICES AND THE LIKE

BACKGROUND OF THE INVENTION

1. Field of the Invention

This invention relates generally to methods, systems, machine readable media and apparatus for protecting intellectual property ("IP"). More specifically, this invention relates to techniques for protecting designs and/or configuration data in SRAM-based programmable logic devices and similar configurable devices.

2. Description of Related Art

A programmable logic device (PLD) is a programmable integrated circuit that allows the user of the circuit, using software control, to customize the logic functions the circuit will perform. Programmable logic devices supplied by integrated circuit manufacturers like Altera Corporation of San Jose, Calif. are not inherently capable of performing any specific function. The user, in conjunction with software supplied by the PLD manufacturer, can program the PLD to perform the specific function or functions required by the user's application. The PLD then can function like a dedicated logic chip.

A typical PLD consists of an array of logic cells that can be individually programmed and interconnected to each other to provide internal input and output signals, thus permitting the performance of highly complex combinational and sequential logic functions. Users typically prepare electronic designs using CAD software tools, usually provided by the chip vendor, to do technology mapping, partitioning and placement, routing and binary configuration data output generation. The resulting binary configuration data can be programmed into a ROM connected to the configurable device or downloaded to the configurable device from a connected computer.

A program is implemented in a PLD by setting the states of programmable elements such as memory cells. These memory cells may be implemented with volatile memories, such as SRAMs, which lose their programmed states upon termination of power to the system. If the programmable elements used are volatile memories, the memory cells must be configured upon each system power-up in order to configure the PLD.

In this disclosure, a "configurable device" is a programmable device that ultimately contains user logic (that is, the function(s) programmed and implemented in a programmable device by a user, for example an electronic design). Typically, such a device has a volatile memory and must be programmed upon each power-up, though not every configurable device must possess these characteristics. Examples of configurable devices include SRAM PLDs and RAM-based PLDs (for example, Altera FLEX and STRATIX devices).

Moreover, in this disclosure, a "secure device" is defined to be a non-volatile programmable device, a custom logic device, a microprocessor or other similar device that is a secure device (that is, a device from which a design cannot be directly determined or read out of the device, such as an Altera MAX device) and which installs user logic and possibly other functionalities into a configurable device (as defined above) from a configuration data memory (a "storage device"). As noted below, a storage device may be a component separate and distinct from a secure device or the two devices may be integrated to some degree in a single component. Where a storage device and a secure device are distinct, the two devices may be connected by a secure link to prevent copying of data transferred between the two devices.

To use a configurable device (such as an SRAM-based FPGA), a user captures a user's electronic design using any of several design capture tools and then uses software tools to convert the captured design into a specific bitwise representation that can be stored in a storage device, such as an EEPROM. Upon startup, the storage device supplies the bitwise representation to the configurable device, typically under the control of a secure device, enabling the configurable device to perform the function of the programmed electronic design.

In some cases, the configuration data in a storage device is a bitwise representation that, when installed by a secure device into a configurable device can implement user logic to be used by the configurable device. However, the configuration data may also take on other formats and these are considered to be within the scope of the present invention. For example, either or both of the configurable device and the secure device might include an integrated microprocessor. Part of the configuration data would then be computer code that would be used by the microprocessors. The microprocessors could implement the functionality of random number generators, encryption and decryption circuits, and comparators that might otherwise be implemented with logic. The actual user logic in the configurable device would still be implemented in the normal fashion—just the configuration security circuits would be implemented with the microprocessors. Any appropriate manner of storing and using configuration data is deemed to fall within the meaning of the term "configuration data" in this disclosure.

By the time a bitwise representation is created, it typically represents significant time, money and effort. To encourage individuals and companies to continue to invest in the research and development of new electronic designs, and to protect the investment represented by existing completed designs, it is desirable to provide some method of protecting the electronic designs from illegal or otherwise unauthorized copying and/or use, which has become a more acute problem in the field.

To make an illegal copy of the electronic design, as implemented in a configurable logic device, one need only make a copy of the bitwise representation stored in the storage device. This can be done by copying the bitstreams transmitted externally between a configurable device and the device installing the configuration data and using the copied bitstream with a copied configurable device. Thus, the copied bitwise representation can be illegally used with other programmable devices. It therefore is desirable to make it as difficult as possible to copy the bitwise representation of the electronic design.

Several techniques have been developed to address the illegal copying of programmable device programming software by users. The goal of these techniques is to make it impossible (or at least much more difficult) to illegally copy user designs and/or other proprietary information or data. While these efforts have met with some success, they have some shortcomings.

As noted above, microprocessors can been used to configure programmable devices prior to operation. However, implementing a microprocessor to configure the device does not address the security issue. A microprocessor must still externally transmit the configuration data to the configurable device. The configuration data is of finite length and can therefore be captured and used to configure another device without authority from the design's owner.

In another prior technique, the device being programmed sends a constant stream of data to a control device. If the data stream is not correct, the control device can assert a reconfiguration signal and stop operation of the programmable device. The data stream can be generated in a number of different ways to prevent decoding of the data stream's pattern. However, if the reconfiguration signal is disconnected, the control device loses power over the device being programmed. While some measures can be taken to try and monitor the status of the devices' link, unscrupulous users can still circumvent these protective measures. Furthermore, the configuration data that is driven to the configurable device could be captured and used to configure the configurable device without the control device.

Another technique for preventing the theft of design software is found in U.S. Pat. No. 5,970,142. In that design, the configurable device generates an encryption key which is transmitted to the control device (also referred to as a storage device in the '142 Patent). An encryption circuit in the control device encrypts all of the configuration data and sends the encrypted configuration data to the configurable device. The configurable device then decrypts the entire configuration data and uses the decrypted configuration data to program the configurable device to create the user logic.

As will be appreciated, the system requires that all of the configuration data be encrypted and decrypted completely. This approach also requires either that special circuitry be incorporated into the configurable device and the storage device or that unencrypted data be used to configure part of the configurable device before transfer of the encrypted configuration data. Configuration data cannot be used to create a decryptor in the configurable device since that data is encrypted before it is sent to the configurable device. As will be appreciated, this technique cannot be practically "retrofitted" into existing configurable device systems, due to the special circuitry and/or multiple configuration steps needed for its implementation. As will be appreciated by those skilled in the art, onboard encryption and/or storage/generation of an encryption key is both more expensive and more complicated. The key must be well hidden and area and/or other resources on the configurable device are permanently dedicated to security unnecessarily sometimes.

Techniques that permit full use of designs and configuration data while protecting the proprietary interests of the owners of the intellectual property incorporated in such designs, systems and devices would represent a significant advancement in the art.

BRIEF SUMMARY OF THE INVENTION

Use of an electronic design in a configurable device is controlled by a secure device. The configurable device includes an authorization code generator having a sequence generator and an encryption core implementing an encryption algorithm. The secure device uses the same sequence generator and encryption core in its own authorization code generator. The sequence generators in the configurable device and secure device generate identical streams of values that are encrypted using the encryption algorithm. The encrypted values are compared in the configurable device by a comparator. When the streams of encrypted values are not identical, the electronic design is prevented from operating. Where the period of the sequence generated by the sequence generators is long, such as $2^{64}$, the output of the encryption cores will contain that many different encrypted values, a substantial amount of highly randomized output used as authorization code for the protection of the electronic design. The authorization codes are as secure as the encryption algorithm used to generate them.

According to a method of the present invention, the configurable device can be programmed to implement the electronic design and a protection circuit that includes the authorization code generator and a suitable authorization means, such as a comparator and any needed enabling/disabling circuitry for controlling operability of the electronic design. A secure device is provided having an identical authorization code generator. In each device, the authorization code generator includes a sequence generator, such as a counter, a linear feedback shift register or a pseudo random number generator. This sequence generator generates a sequence of values, preferably having a long period, such as $2^{64}$. Each value in the sequence generated is sent to the authorization code generator's encryption core where it is encrypted using an appropriate encryption algorithm. In this way, a long, non-repeating sequence of values is generated and sent by each encryption core to the authorization means for comparison. The secure device can be selected to prevent copying of the authorization code generator. Moreover, start values, incremental values, keys, etc. can be generated when the devices are powered up and can be hidden in the bitstreams used in programming and implementing the invention. Likewise, a system according to the present invention uses similar components and provides an apparatus for controlling use of the electronic design.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

The following detailed description of the invention will refer to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these limited embodiments.

Embodiments of the present invention will be explained in connection with various specific devices, circuits, applications, etc. herein. However, these references are for purposes of illustration only and are not intended to limit the present invention in any way. For example, one or more embodiments of the present invention will be explained using programmable logic devices (PLDs) to illustrate the present invention. However, the invention is widely applicable to other devices and in other environments. Moreover, embodiments of the present invention may be used in a wide variety of functions and/or applications.

The present invention provides techniques, methods and apparatus for controlling user logic and thus assisting in protecting user designs and/or other proprietary information by securing operation of a configurable device using a secure device. In some embodiments of the present invention, the configurable device is an SRAM based PLD on which is implemented a user design and protection circuit. A CPLD coupled to the configurable device must provide a valid authorization code to the configurable device to allow use of the configurable device in connection with the user's design. Because the security feature of the present invention can be implemented as a programmable component of a configurable device and another component in a secure device, a user does not have to buy the security feature unless and until it is needed. Moreover, because the secure device can be a relatively simple, inexpensive one-time programmable device (such as a flash programmable or EEPROM device), the security option is practical for a wider variety of situations than earlier systems and the relatively low incremental cost of the second device cost is the only cost associated with adding the security of the present invention. This provides an inexpensive, reasonably secure alternative for users for whom cost is a consideration and permits retrofitting of the security functionality, even after the configurable device has been purchased and the configuration data developed.

Figure 1:
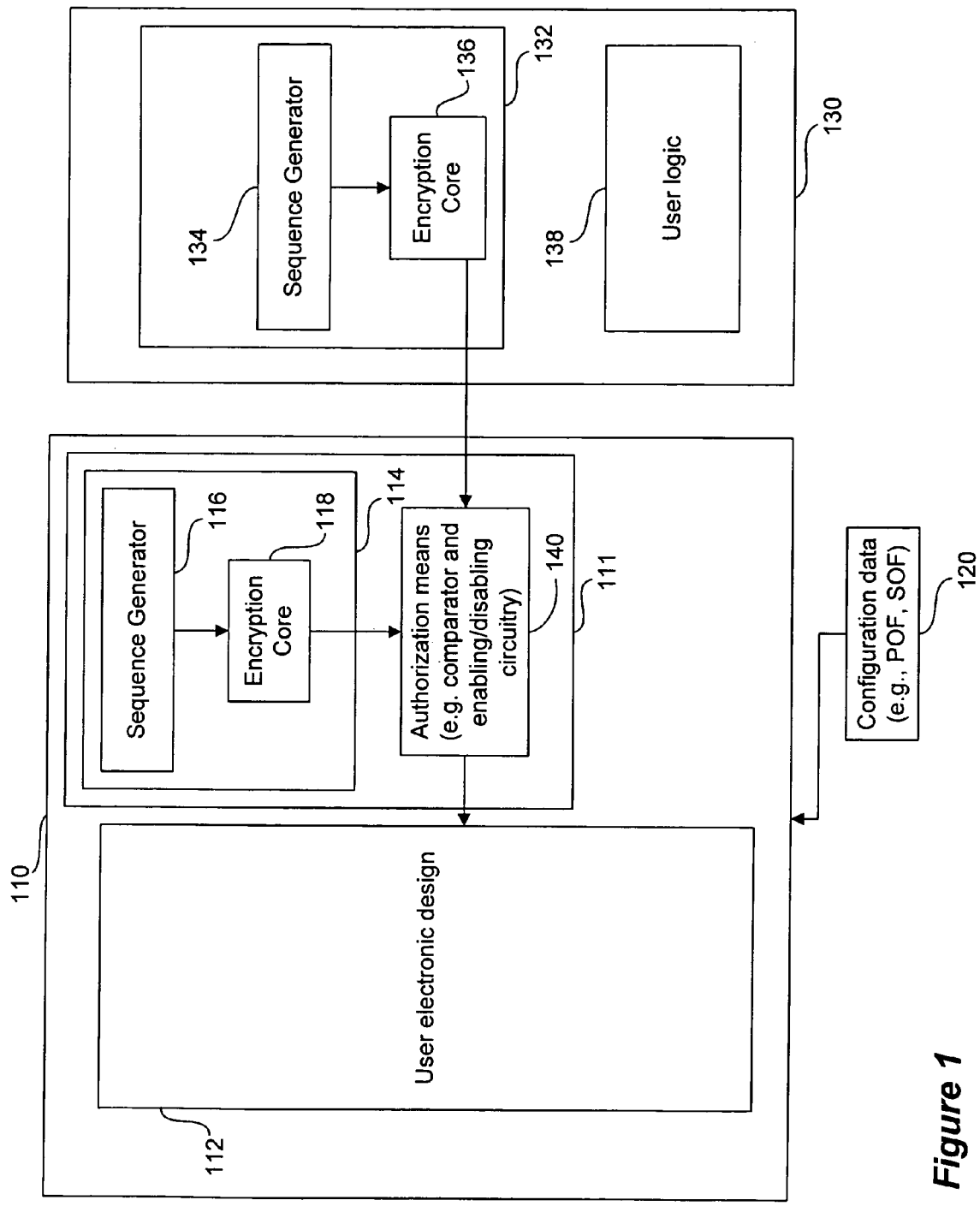
FIG. 1 is a schematic diagram of a system implementing one embodiment of the present invention using a configurable device and a secure device.

FIG. 1 illustrates one embodiment of the present invention in which a configurable device 110 is to be programmed by configuration data 120. As mentioned above, examples of configurable devices include SRAM PLDs and RAM-based PLDs (for example, Altera FLEX devices, STRATIX devices, other look up table based devices and any other suitable devices known or apparent to those skilled in the art). Essentially, the present invention operates on the principle that both a secure device 130 and the configurable device 110 must implement and run identical protection circuits that produce identical authorization codes which, unlike prior codes, are difficult or impossible to reproduce in order to operate the configurable device 110 in connection with a user's electronic design that is to be protected.

The configuration data 120 may be provided by any suitable source (for example, a ROM or computer system on which the configuration data is stored), as will be appreciated by those skilled in the art. When embodiments of the present invention are used, the configuration data 120 may be openly readable, eliminating a costly and sometimes complicated step or function (for example, encryption of all of the configuration data) found in some earlier systems. Data 120 is used to generate a protection circuit 111 and a user's electronic design 112. In the embodiment of the present invention shown in FIG. 1, circuit 111 includes a configurable device authorization code generator 114. Authorization means 140 for authorizing use of the configurable device 110 is coupled to both the electronic design 112 and the authorization code generator 114 and is used for verifying the devices' authorization codes and enabling and/or disabling the configurable device 110 and/or user electronic design 112. Authorization means 140 may be a comparator or any other suitable device, structure or mechanism used for evaluating a plurality of input streams or signals coming from devices or structures coupled to means 140. The phrases "coupled to" and "connected to" and the like are used herein to describe a connection between two elements and/or components and are intended to mean coupled either directly together, or indirectly, for example via one or more intervening elements and, where possible, by wireless connection as well.

Because the configuration data consists of a bitstream made of millions and millions of bits, it is impractical for an unauthorized user to determine which bits are used to create the configurable device's protection circuit 111 (for example, the authorization code generator 114 and authorization means 140) and how to subvert embodiments of the present invention using such a configuration. The user electronic design 112 may either be enabled or disabled initially, in which case the authorization means 140 may include means for disabling or enabling operation of the electronic design 112, respectively.

In the embodiment of the present invention shown in FIG. 1, configurable device authorization code generator 114 includes a sequence generator 116 and an encryption core 118 coupled thereto. Sequence generator 116 can be any suitable generator of long sequences of numbers (for example, having a long period such as $2^{64}$ or something comparable). Generator 116 might be and/or include a counter, a linear feedback shift register or any other pseudo random number generator meeting the need for long, non-repeating number sequences. The output numbers of the sequence generator 116 are provided to encryption core 118. Core 118 uses each number in the sequence generated as the seed or base for a different authorization code value. Thus, the output of core 118 is a sequence of values that are the output of the encryption algorithm used in core 118. If, for example, the period of the sequence generated by generator 116 is $2^{64}$, then the output of core 118 will contain that many different encrypted values, a substantial amount of highly randomized output used as authorization code for the protection of the user's electronic design. As noted below, additional steps may be taken to further reduce the chances of generating a "predictable" and/or "repeatable" sequence.

The encryption algorithm used can be any appropriate encryption, depending on the security needs of the system. Some encryption algorithms that might be useful include DES, triple DES and AES or any other encryption algorithms that can used in these types of applications. Others are known to those skilled in the art. Depending on the application and/or use of the system, strong encryption may be desirable, though it is not necessary in every embodiment of the present invention and environment in which the present invention might by used. In the embodiment shown in FIG. 1, the output of core 118 is the configurable device authorization code.

As will be appreciated by those skilled in the art, additional steps may be performed before or after operation of core 118. For example, after the encryption algorithm of core 118 has finished running for a given sequence value, the authorization code generated may be further manipulated in any appropriate way. In the configuration of FIG. 1, no other steps are shown and authorization means 140 can be a direct comparator. Whatever data is intended to be the authorization code for the configurable device 110 is transmitted to the comparator 140.

A secure device 130 also is provided in the illustrated system of FIG. 1. The secure device 130 typically is a CPLD such as a MAX or MAX II device manufactured and sold by Altera. In one embodiment of the present invention, the CPLD is a flash based CPLD utilizing a LUT based architecture, such as the Altera MAX II device. Such a device may be seen traditionally as an FPGA architecture not a CPLD. Other embodiments of the present invention may use an EEPROM CPLD like Altera's MAX device. Alternatively, an ASIC can be used as the secure device 130. The secure device 130 should be relatively secure from unauthorized copying or analysis. Devices that are programmed once and have this security attribute might include flash programmable devices and EEPROM programmable devices. Other devices may be suitable, as will be appreciated by those skilled in the art.

In the illustrative system of FIG. 1, secure device 130 includes a secure device authorization code generator 132 that is essentially identical to the configurable device's authorization code generator 114. Generator 132 includes a sequence generator 134 and encryption core 136 that are identical to the sequence generator 116 and core 118 found in the configurable device 110. This means that the outputs of generators 116 and 132 should be identical. Whenever the configurable device is powered up, it notifies the secure device to begin the authorization code generation process and to send the secure device's generated authorization code to the configurable device for verification.

As an example of operation of one embodiment of the present invention, when a counter is used as the sequence generator, the two sequence generators must start with the same seed value and use the same increment value. Similarly, if the sequence generators are LFSRs, the same start value must be used, too. Moreover, the cores 118, 136 must use the same key or be otherwise related so that their outputs are identical or can otherwise be compared to verify authorization to use the user's electronic design 112. In some embodiments of the present invention, comparison of the devices' authorization codes may simply be checking that they are identical. In other embodiments, additional manipulation and/or processing of the devices' codes may be performed.

FIG. 1 represents a simple implementation of the present invention in which the encrypted data stream from the secure device 130 likely is sufficiently secure to protect against unauthorized use and/or copying of the user's electronic design 112. When using encryption in this way, as will be appreciated by those skilled in the art, several cycles may be required to generate, encrypt and compare the authorization codes. In such cases, the system must wait for the encryption algorithm to finish operating on the long sequence strings provided by sequence generators 116, 134.

One way to obtain the various identical values needed for the embodiment of the present invention shown in FIG. 1 is to take a user string (for example, "Good morning, Dr. Chandra") and hash the user string. From the hash string so generated, numbers can be taken to serve as initialization values, increment values, the encryption algorithm key, etc. as needed. The hashed information also can be used to select the output sequence of the encrypted bits, or even how many bits of the encrypted result are used. Just because a given number of output bits may be created (for example, 64), it is not necessary to use all of them. In some embodiments, a user may be allowed to choose a unique key for the encryption algorithm. In other embodiments, the configurable device may generate a random number to initialize both the configurable device and secure device authorization code generation circuits so that the initialization value(s), etc. are not the same each time. This can be done when the devices are powered up or can be done whenever the generators 116, 134 cycle through their long sequences.

Like its twin in the configurable device 110, the output of sequence generator 134 is coupled to an encryption core 136 that is identical to core 118. The output of core 136, which is the authorization code for the secure device 130, is transmitted to the authorization means 140. The secure device 130 may also include user logic 138 and/or any other logic desired.

The configurable device authorization code (that is, the output of the configurable device authorization code generator 114) is transmitted to authorization means 140. The authorization means 140 is coupled to the user's electronic design 112 or any other programmed logic that a user seeks to implement and use on the configurable device 110 and wishes to protect. As mentioned above, in FIG. 1, the authorization means 140 can be a comparator configured to compare the bitstreams from the configurable device authorization code generator 114 and from the secure device authorization code generator 132. For example, the comparator 140 may be an XOR gate or other easily implementable comparator. The authorization means 140 may include any other circuitry and/or control apparatus (for example, enabling and/or disabling circuitry) appropriate for performing the needed functions of the present invention. A comparator may be the authorization means of the system and, as will be appreciated by those skilled in the art, other types of authorization means can be used as appropriate. Such authorization means can include means for comparing the devices' authorization codes as well as enabling/disabling means for controlling operability of the configurable device 110 and/or user's electronic design 112.

If the bitstreams do not match one another bit for bit, the user electronic design 112 is or remains disabled. This may be done by initially disabling the user electronic design 112 and only enabling after authorization code verification, or by initially enabling the user electronic design 112 and sending a kill signal from the authorization means 140 if the authorization codes do not match. Specific methods and techniques for disabling a user's electronic design are not discussed in detail here, as those are well known to those skilled in the art.

Figure 2:
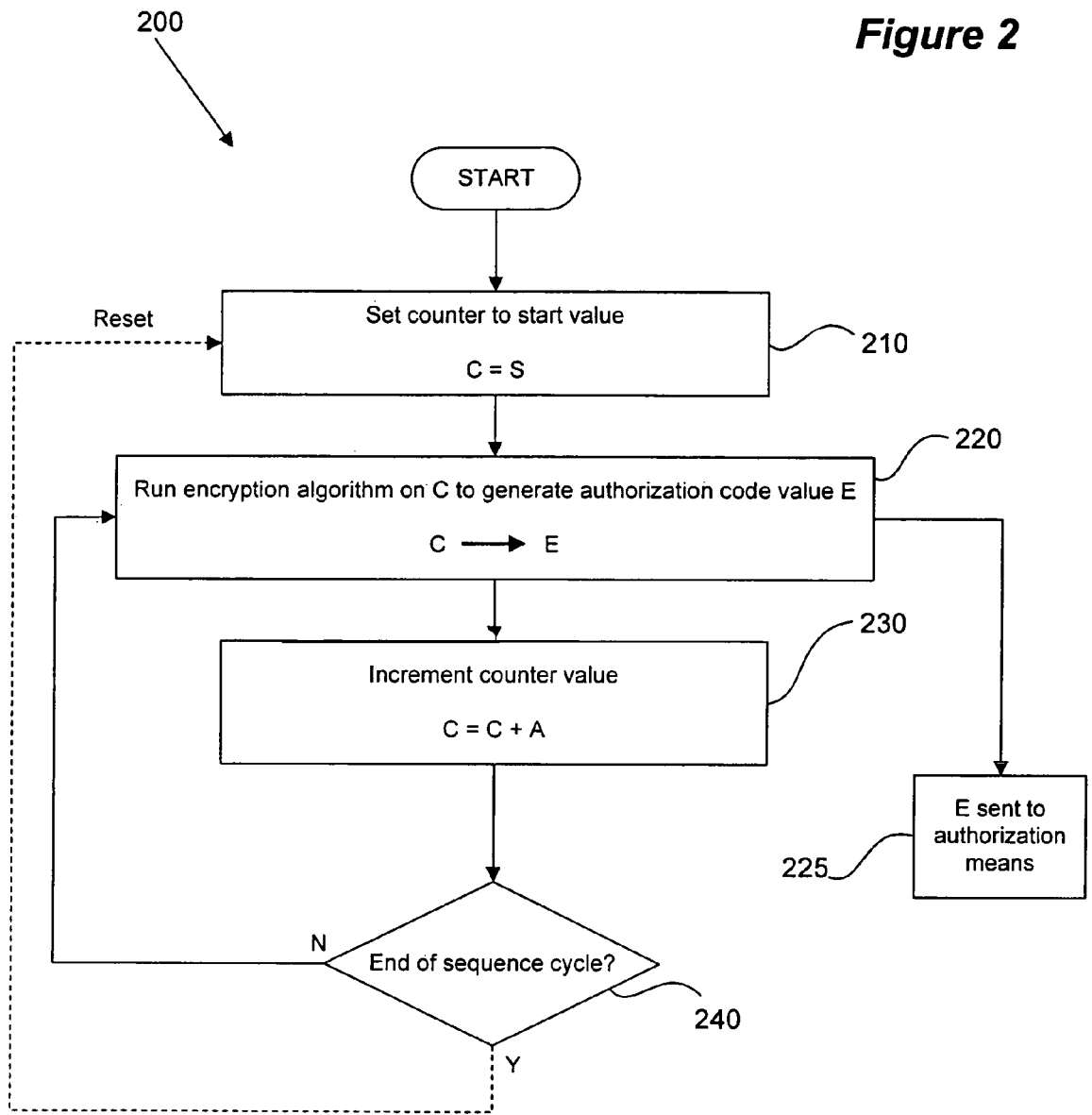
FIG. 2 is a flow diagram of a method according to one embodiment of the present invention by which a sequence generator generates a long sequence of values that are encrypted and sent to the authorization means of the configurable device.

FIG. 2 illustrates one embodiment of the operation of a counter-based authorization code generator usable with embodiments of the present invention. In the embodiment of the invention depicted in FIG. 2, the authorization code generator can be in either the secure device or the configurable device. In FIG. 2 the counter value C is initialized at 210 with a start value S. At step 220 the current counter value C is encrypted to generate an authorization code E, which is sent to the authorization means at 225. The counter then increments the count value C by an increment value I at 230. In some embodiments, the increment value is a prime number. A decision 240 may then be made as to whether the sequence generator has reached the end of its sequence generation cycle. This decision may be optional, so that in its absence the process merely runs until it is ended. If the decision is used and the sequence has reached its end, then the process may stop or may reset itself, as indicated by the dashed line in FIG. 2. If not, the new value of C is then provided for encryption at step 220 and the process continues.

Figure 3:
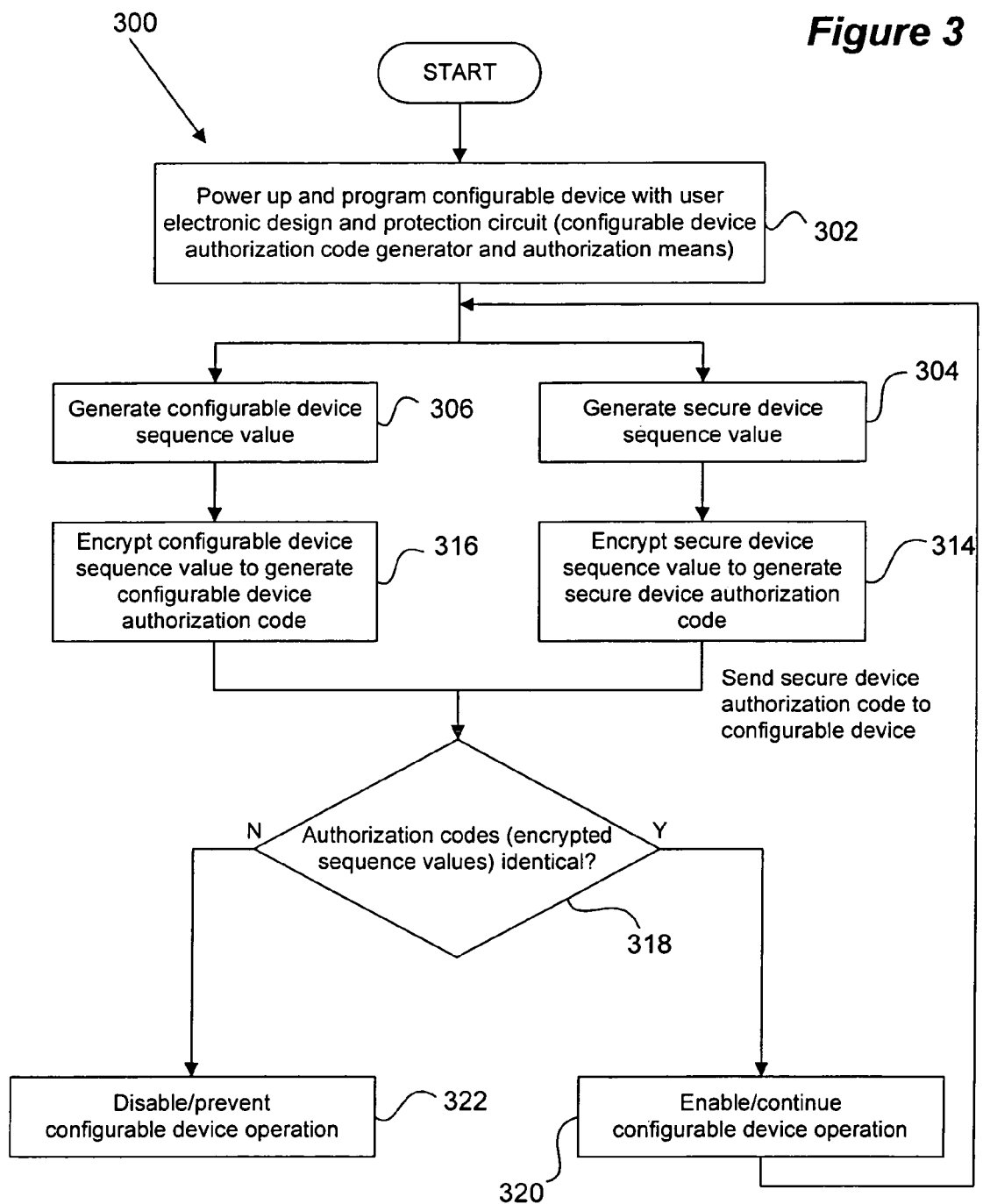
FIG. 3 is a flow diagram of a method according to the present invention in which the configurable device and the secure device generate authorization codes that are compared to control operation of the configurable device.

Another method according to one embodiment of the present invention is shown in FIG. 3. This method can be used in connection with the system of FIG. 1, for example, with some variations if desired, as will be appreciated by those skilled in the art. In this embodiment, the method 300 starts and the configurable device is powered up and configured with the user electronic design and the protection circuit, which in this embodiment includes the configurable device authorization code generator and a comparator at 302. The secure device and configurable device both have authorization code generators that begin authorization code generation at once in this embodiment. Each secure device sequence value is generated at 304. Thereafter, at 314, the secure device sequence value is encrypted to generate the secure device authorization code, after which the secure device authorization code is sent to the configurable device.

Each configurable device sequence value is generated at 306 and is encrypted at 316 to generate the configurable device authorization code. At decision 318, which may be performed by the authorization means (for example, a comparator), the devices' authorization codes (their encrypted sequence values) are compared by verifying that the authorization codes are identical on a bitwise basis. If the codes are identical, then at 320 operation of the configurable device (and user electronic design) is authorized and enabled (if disabled initially) or continued (if enabled initially). If, on the other hand, the authorization codes are not identical, then at 322 operation of the configurable device is disabled (if enabled initially) or not allowed to start (if disabled initially).

Figure 4:
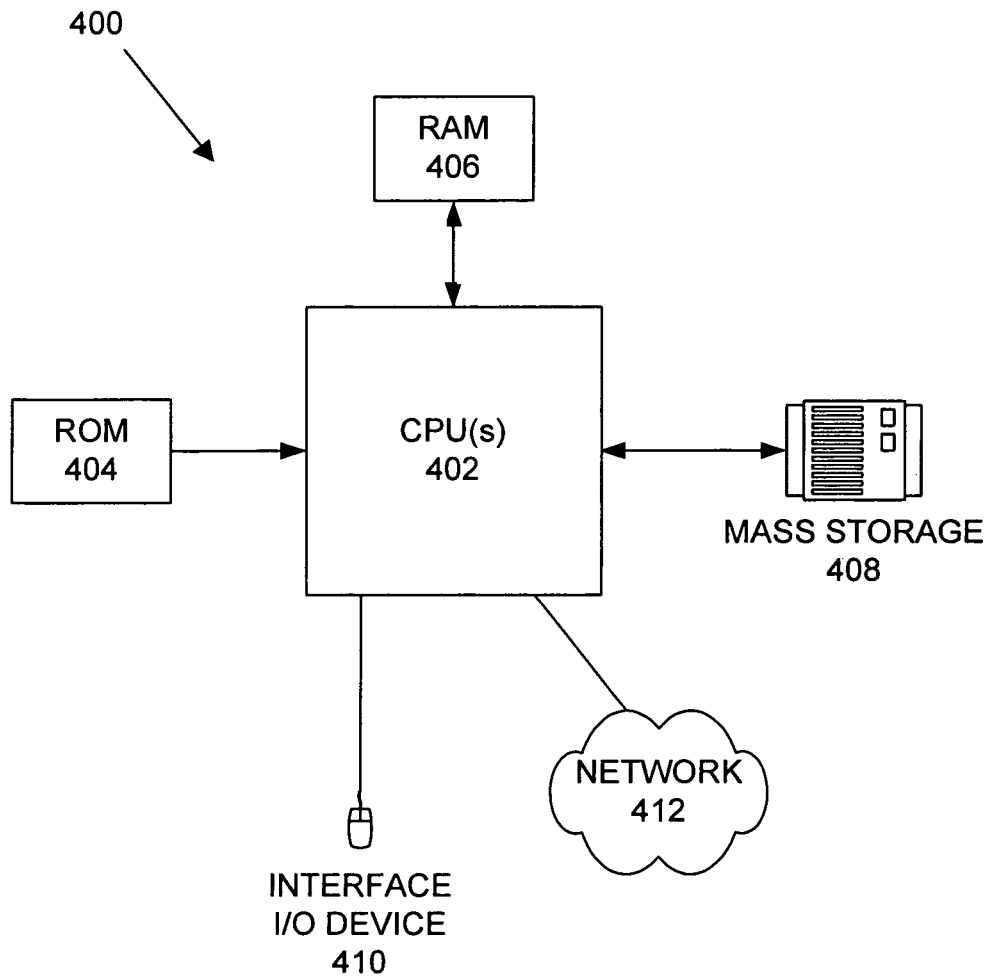
FIG. 4 is a block diagram of a typical computer system suitable for implementing an embodiment of the present invention.

FIG. 4 illustrates a typical computer system that can be used in connection with one or more embodiments of the present invention. The computer system 400 includes one or more processors 402 (also referred to as central processing units, or CPUs) that are coupled to storage devices including primary storage 406 (typically a random access memory, or RAM) and another primary storage 404 (typically a read only memory, or ROM). As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media described above, including a computer program product comprising a machine readable medium on which is provided program instructions according to one or more embodiments of the present invention. A mass storage device 408 also is coupled bi-directionally to CPU 402 and provides additional data storage capacity and may include any of the computer-readable media described above, including a computer program product comprising a machine readable medium on which is provided program instructions according to one or more embodiments of the present invention. The mass storage device 408 may be used to store programs, data and the like and is typically a secondary storage medium such as a hard disk that is slower than primary storage. It will be appreciated that the information retained within the mass storage device 408, may, in appropriate cases, be incorporated in standard fashion as part of primary storage 406 as virtual memory. A specific mass storage device such as a CD-ROM may also pass data uni-directionally to the CPU.

CPU 402 also is coupled to an interface 410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to a computer or telecommunications network using a network connection as shown generally at 412. With such a network connection, it is contemplated that the CPU might receive information from the network, or might output information to the network in the course of performing the above-described method steps. The above-described devices and materials will be familiar to those of skill in the computer hardware and software arts.

The hardware elements described above may define multiple software modules for performing one or more steps and/or operations according to embodiments of the present invention. For example, instructions for running a power consumption estimation program, a design tool or any other appropriate program may be stored on mass storage device 408 or 404 and executed on CPU 402 in conjunction with primary memory 406. In synthesizing a design from a simulation version, a user may use a compiler to generate the design for implementation on hardware.

Figure 5:
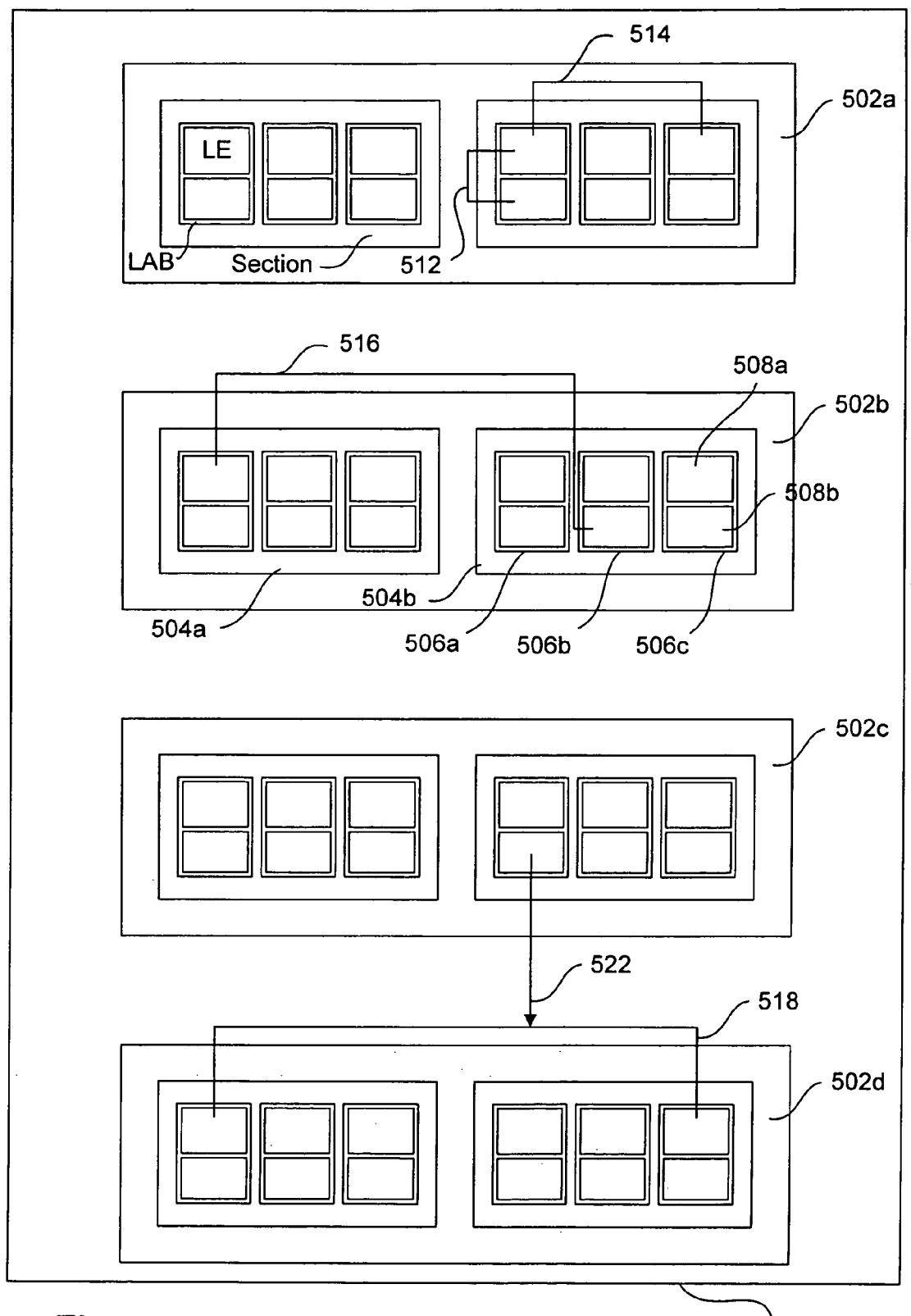
FIG. 5 is an idealized block representation of the architecture of an arbitrary hardware device, including interconnects, which may be employed in accordance with this invention.

The form of a compiled design according to one or more embodiments of the present invention may be further understood with reference to a hypothetical target hardware device having multiple hierarchical levels. Such a hardware device is represented in FIG. 5. This idealized representation roughly conforms to the layout of a FLEX 10K programmable logic device available from Altera Corporation of San Jose, Calif. In FIG. 5, a programmable logic device 500 is segmented into a plurality of "rows" to facilitate interconnection between logic elements on a given row. In the hypothetical example shown, there are four rows: 502*a*, 502*b*, 502*c*, and 502*d*.

Each row of programmable logic device 500 is further subdivided into two "half-rows." For example, row 502*b* is shown to contain a half-row 504*a* and a half-row 504*b*. The next lower level of the hierarchy is the "logic array block" (LAB). Half-row 504*b*, for example, contains three LABs: an LAB 506*a*, an LAB 506*b*, and an LAB 506*c*. Finally, at the base of the of the hierarchy are several logic elements. Each such logic element exists within a single logic array block. For example, LAB 506*c* includes two logic elements: a logic element 508*a* and a logic element 508*b*.

In short, PLD 500 includes four hierarchical levels: (1) rows, (2) half-rows, (3) LABs, and (4) logic elements (LEs). Any logic element within PLD 500 can be uniquely specified (and located) by specifying a value for each of these four levels of the containment hierarchy. For example, logic element 508*b* can be specified as follows: row (2), half-row (2), LAB (3), LE (2). To fit a logic design onto a target hardware device such as that shown in FIG. 5, a synthesized netlist is divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 500 includes multiple levels of routing lines (interconnects). These connect the uniquely placed logic cells to complete circuits. In PLD 500, for example, four levels of interconnect are provided, one for each of the four hierarchy levels. First a local interconnect such as interconnect 512 is employed to connect two logic elements within the same LAB. At the next level, a LAB-to-LAB interconnect such as interconnect 514 is employed to connect two LABs within the same half-row. At the next higher level, a "global horizontal" interconnect is employed to connect logic elements lying in the same row but in different half-rows. An example of a global horizontal interconnect is interconnect 516 shown in row 502*b*. Another global horizontal interconnect is shown as interconnect 518, linking logic elements within row 502*d*. Finally, a "global vertical" interconnect is employed to link a logic element in one row with a logic element in a different row. For example, a global vertical interconnect 522 connects a logic element in the first LAB of the second half-row of row 502*c* to two separate logic elements in row 502*d*. In the embodiment shown, this is accomplished by providing global vertical interconnect 502 between the above-described logic element in row 502c to global horizontal interconnect 518 in row 502d. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit. The interconnect structure and overall architecture of the Altera FLEX 10K family of PLDs is described in much greater detail in U.S. Pat. No. 5,550,782, issued Aug. 27, 1996, naming Cliff et al. as inventors, and entitled "PROGRAMMABLE LOGIC ARRAY INTEGRATED CIRCUITS." That patent is incorporated herein by reference for all purposes. Additional discussion of the FLEX 10K and other PLD products may be found in other publications from Altera Corporation of San Jose, Calif.

Briefly, in the FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 9-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ASICs that can benefit from application of the present invention.

Figure 6:
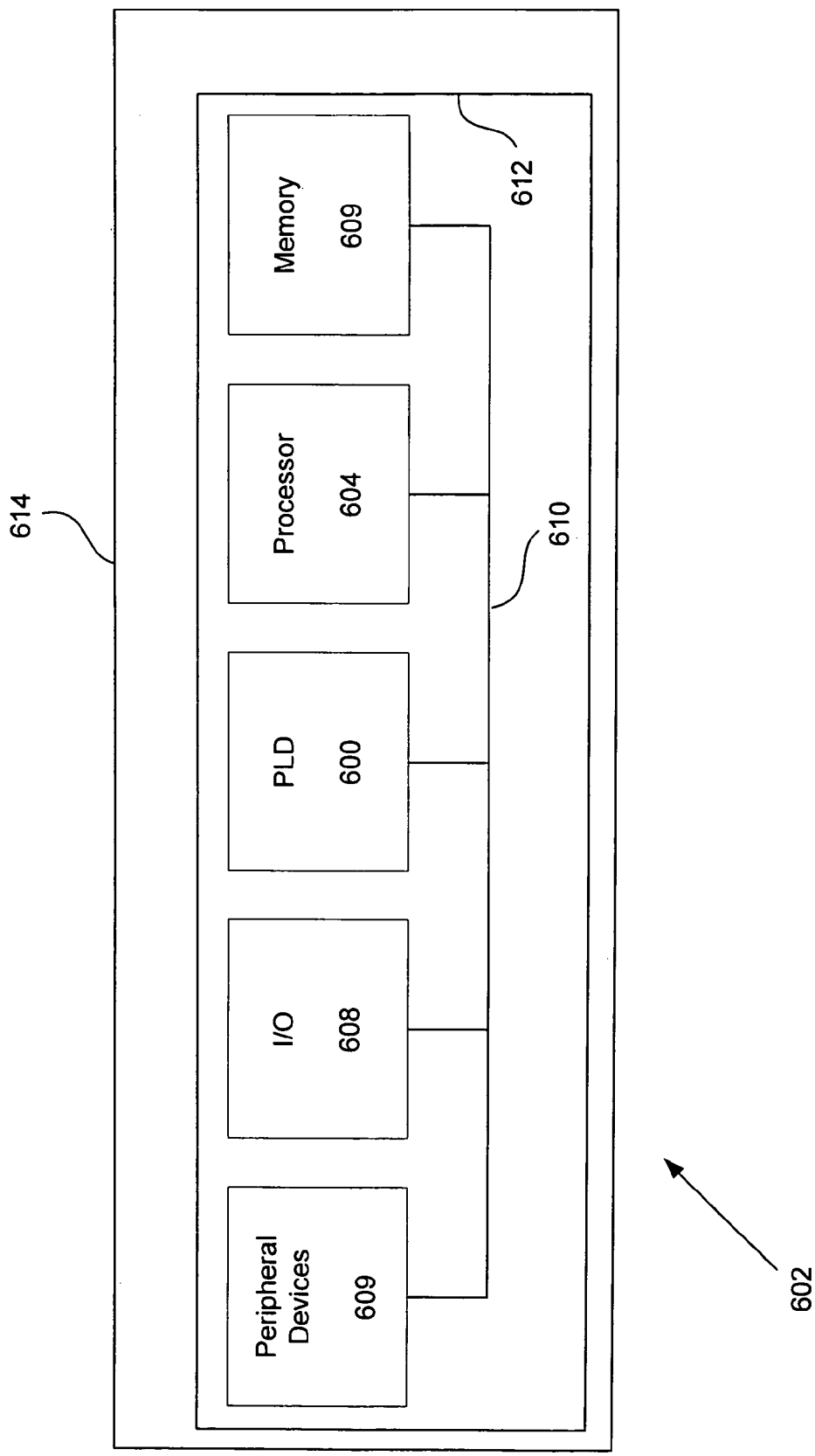
FIG. 6 is a block diagram depicting a system containing a PLD prepared in accordance with this invention.

This invention also relates to programmable logic and other devices programmed with a design prepared in accordance with the above described methods and/or using a computer program product according to one or more embodiments of the present invention. The invention further relates to systems employing such programmable logic devices. FIG. 6 illustrates a PLD 600 of the present invention in a data processing system 602. The data processing system 602 may include one or more of the following components: a processor 604; memory 606; I/O circuitry 608; and peripheral devices 609. These components are coupled together by a system bus 610 and are populated on a circuit board 612 which is contained in an end-user system 614.

The system 602 can be used in a wide variety of applications, such as computer networking, data networking, instrumentation, video processing, digital signal processing, or any other application where the advantage of using reprogrammable logic is desirable. The PLD 600 can be used to perform a variety of different logic functions.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation illustrated and described. Therefore, the described embodiments are illustrative and not restrictive, and the invention should not be limited to the details given herein but should be defined by the following claims and their full scope of equivalents, whether foreseeable or unforeseeable now or in the future.

The invention claimed is:

1. A method comprising:
receiving at a configurable device a configuration of a protection circuit, wherein the protection circuit is a portion of the configurable device after the configurable device is configured;
receiving at the configurable device a plurality of secure device encrypted sequence values, the secure device encrypted sequence values generated by a secure device authorization code generator that is separate from the configurable device;
generating a plurality of configurable device encrypted sequence values, wherein said generating is performed by the protection circuit of the configured configurable device; and
comparing the plurality of secure device encrypted sequence values with the plurality of configurable device encrypted sequence values; and
further comprising enabling operation of an electronic design when the plurality of secure device encrypted sequence values are identical to the plurality of configurable device encrypted sequence values.

2. The method of claim 1 further comprising disabling operation of an electronic design when the plurality of secure device encrypted sequence values are not identical to the plurality of configurable device encrypted sequence values.

3. The method of claim 1, wherein the configurable device comprises a programmable logic device.

4. The method of claim 1 further comprising:
generating a plurality of configurable device sequence values, wherein said generating is performed using the protection circuit; and
encrypting the plurality of configurable device sequence values to generate the plurality of configurable device encrypted sequence values.

5. The method of claim 1 further comprising receiving a configuration of an electronic design, wherein the electronic design is a portion of the configurable device.

6. A configurable device comprising:
a protection circuit configurable using configuration data received from a memory device, wherein the protection circuit is operable to generate a plurality of configurable device encrypted sequence values; and
a comparator operable to compare a plurality of secure device encrypted sequence values with the plurality of configurable device encrypted sequence values generated by the protection circuit of the configured configurable device, wherein the plurality of secure device encrypted sequence values are generated by a secure device authorization code generator that is separate from the configurable device: and
further comprising:
an electronic design; and
an enabling circuit operable to enable an operation of the electronic design when the plurality of secure device encrypted sequence values is identical to the plurality of configurable device encrypted sequence values.

7. The configurable device of claim 6 further comprising:
a circuit operable to disable an operation of the electronic design when the plurality of configurable device encrypted sequence values is not identical to the plurality of secure device encrypted sequence values.

8. The configurable device of claim 6, wherein the configurable device is a programmable logic device.

9. The configurable device of claim 6 further comprising:
a configurable device sequence generator operable to generate a plurality of configurable device sequence values; and
a configurable device encryption core operable to encrypt the plurality of configurable device sequence values to generate the plurality of configurable device encrypted sequence values.

10. The configurable device of claim 9, wherein the configurable device sequence generator comprises a counter, a linear feedback shift register, or a pseudo-random number generator.

11. The configurable device of claim 9, wherein the configurable device encryption core is operable to apply an Advanced Encryption Standard (AES), a Data Encryption Standard (DES), or triple DES to generate the plurality of configurable device encrypted sequence values.

12. The configurable device of claim 6 further comprising an electronic design wherein the electronic design is configurable from configuration data received from a memory device.

13. A system comprising:
a protection circuit of a configurable device configurable using configuration data received from a memory device, wherein the protection circuit is operable to generate a plurality of configurable device encrypted sequence values;
a secure device authorization code generator operable to generate a plurality of secure device encrypted sequence values, wherein the secure device authorization code generator is separate from the configurable device; and
a comparator operable to compare the plurality of secure device encrypted sequence values with the plurality of configurable device encrypted sequence values: and
wherein the configurable device comprises:
an electronic design; and
an enabling circuit operable to enable an operation of the electronic design when the plurality of secure device encrypted sequence values is identical to the plurality of configurable device encrypted sequence values.

14. The system of claim 13 wherein the configurable device further comprises:
a circuit operable to disable an operation of the electronic design when the plurality of configurable device encrypted sequence values is not identical to the plurality of secure device encrypted sequence values.

15. The system of claim 13, wherein the configurable device is a programmable logic device.

16. The system of claim 13, wherein the configurable device comprises:
a configurable device sequence generator operable to generate a plurality of configurable device sequence values; and
a configurable device encryption core operable to encrypt the plurality of configurable device sequence values to generate the plurality of configurable device encrypted sequence values,
wherein the secure device authorization code generator comprises:
a secure device sequence generator operable to generate a plurality of secure device sequence values; and
a secure device encryption core operable to encrypt the plurality of secure device sequence values to generate the plurality of secure device encrypted sequence values.

17. The system of claim 16, wherein the configurable device sequence generator comprises a counter, a linear feedback shift register, or a pseudo-random number generator, and wherein the secure device sequence generator comprises a counter, a linear feedback shift register, or a pseudo-random number generator.

18. The system of claim 16, wherein the configurable device encryption core is operable to apply an Advanced Encryption Standard (AES), a Data Encryption Standard (DES), or triple DES to generate the plurality of configurable device encrypted sequence values, and
wherein the secure device encryption core is operable to apply an AES, a DES, or triple DES to generate the plurality of secure device encrypted sequence values.

* * * * *